2,938,622
CONVEYOR ACTUATED CONTROL MEANS

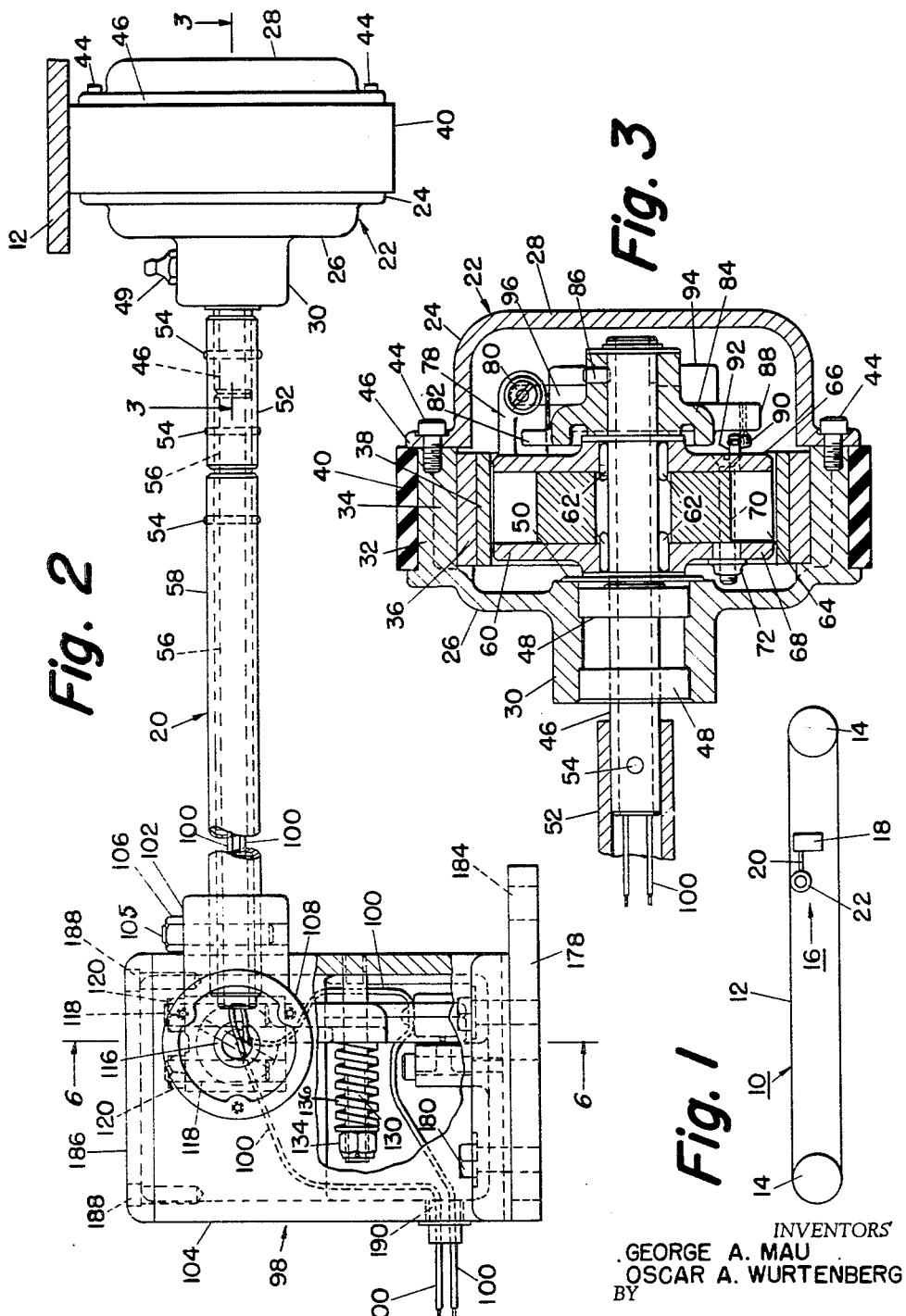

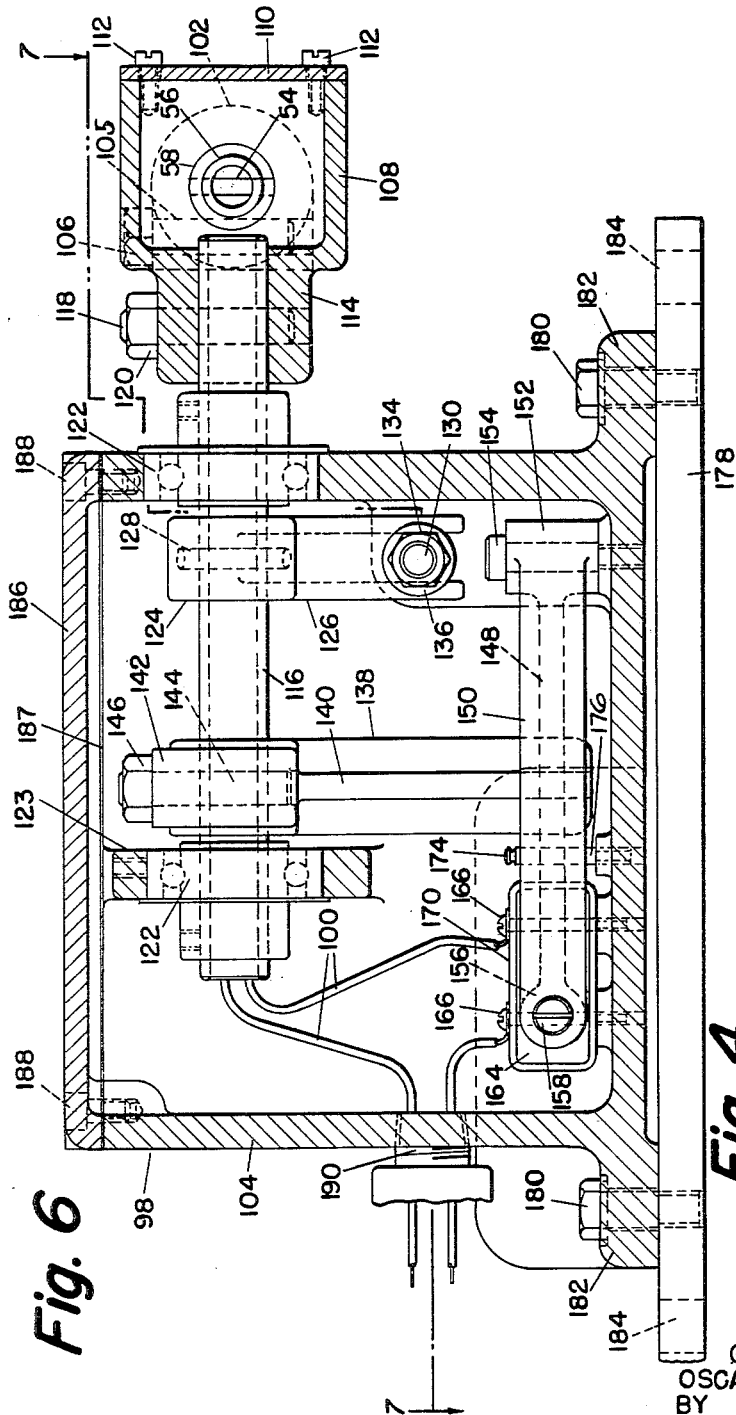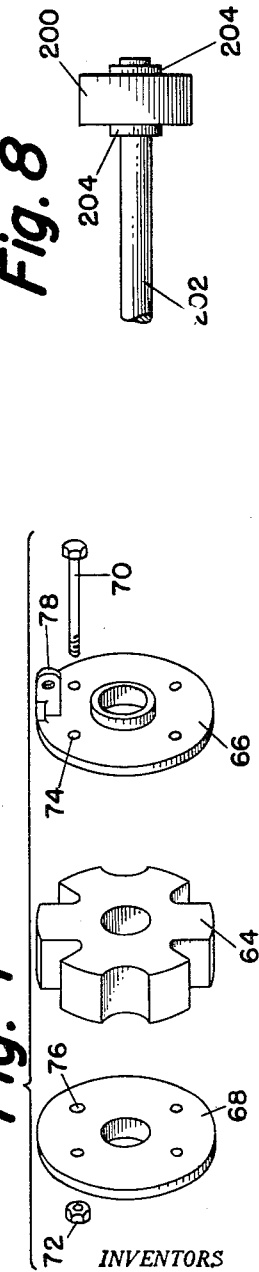

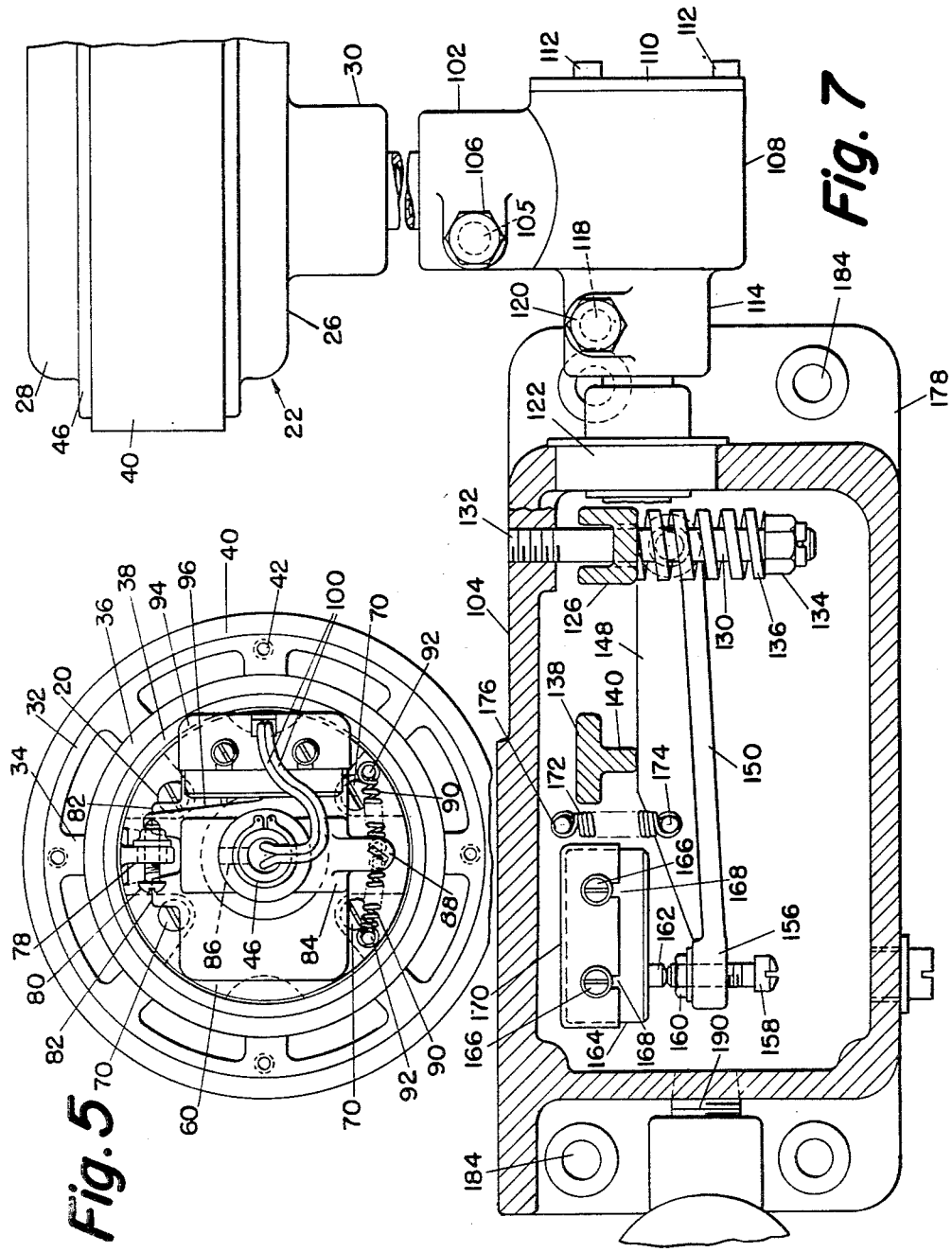

George A. Mau and Oscar A. Wurtenberg, Philadelphia, Pa., assignors to Johnson-March Corporation, Philadelphia, Pa., a corporation of Pennsylvania Filed Oct. 16, 1958, Ser. No. 767,576

11 Claims. (Cl. 198—232)

This invention relates to a control means used in conjunction with conveyors, and it particularly relates to control means for actuating and regulating mechanisms as determined by the load on and movement of the conveyor.

In many industrial installations where conveyors are used to support materials during treatment thereof, it is important to have some means for halting the treatment if the conveyor stops or if there is no material on the conveyor. For example, in certain installations, a conveyor belt is used to move a finely granular material, such as dust from a dust collector or finely ground grain particles, etc., from one station to another. During the progress of the material on the belt, it is necessary to keep the material at least somewhat wetted so that the fine particles do not fly about the area. For this purpose, a spraying mechanism is provided which acts to spray the material on the belt during its movement. However, if the belt should stop in movement, either accidentally or intentionally on the part of the operator, if the spraying is not halted, it would not only result in a waste of liquid but might also unduly saturate and perhaps injure the material. In the same manner, if the belt should be free of the granular material, the liquid from the sprays would be completely wasted.

In addition to spraying means, there are various other mechanisms which may be desirably controlled in accordance with the load on and movement of the conveyor.

Various attempts have been made heretofore to solve each of the above problems individually and together. However, such prior attempts, especially as concerns the simultaneous solution of both problems, have never been sufficiently successful, so that the problems remain very real and very acute.

It is one object of the present invention to completely solve the above problems and to overcome the above and other difficulties by providing a control device which is immediately and simultaneously sensitive to both loading and movement of a conveyor and which automatically operates to control a mechanism in accordance with both said load and movement.

Another object of the present invention is to provide a novel mechanism control means utilizable in accordance with the movement of a conveyor belt.

Another object of the present invention is to provide a novel mechanism control means utilizable in accordance with the load on a conveyor belt.

Another object of the present invention is to provide control means of the above types which are relatively simple yet sturdy in construction, relatively inexpensive to manufacture and maintain, and highly efficient in operation.

Other objects and many of the attendant advantages of this invention will be readily appreciated as the same becomes better understood by reference to the following detailed description when considered in connection with the accompanying drawings wherein:

Fig. 1 is a somewhat diagrammatic view showing a control device embodying the present invention in operative relation to a conveyor.

Fig. 2 is a side view, partly in section and partly in elevation, of the control device of Fig. 1.

Fig. 3 is a sectional view of the rotary switch assembly, taken on line 3—3 of Fig. 2.

Fig. 4 is an exploded view of the magnet assembly.

Fig. 5 is a front elevational view of the rotary switch assembly with the front portion of the housing removed.

Fig. 6 is a sectional view of the load sensing switch assembly, taken on line 6—6 of Fig. 2.

Fig. 7 is a view, partly in section and partly in elevation, taken on line 7—7 of Fig. 6.

Fig. 8 is a side elevational view of an alternate form of rotary switch means.

Referring now in greater detail to the various figures of the drawings wherein similar reference characters refer to similar parts, there is shown in Fig. 1 a conveyor, generally designated 10, comprising a belt 12 movable around pulleys 14. Under the upper flight of belt 12 is positioned a control device, generally designated 16, comprising a housing 18 from which projects an arm 20 having a rotary switch means 22 in contact with the undersurface of the upper flight of belt 12.

The switch assembly 22 (as best shown in Figs. 3 and 5) comprises a housing 24 consisting of two hollow sections 26 and 28. The section 26 comprises a casting having a centrally-arranged, hollow boss 30 at its rear and an annular, slightly depressed ring portion 32 at its forward periphery. The ring portion 32 is connected through annularly-spaced, integral webs 34 with an iron field ring 36 encircling a copper conductor ring 38. Around the ring portion 32 is positioned a flexible tire 40 made of rubber or the like. The tire 40, field ring 36 and conductor ring 38 all are connected to the ring portion 32 of the housing 24 and rotate therewith.

The ring portion 32 is provided with annularly-spaced, tapped holes 42 (see Fig. 5) adapted to threadedly receive screws 44 extending through mating holes in annular flange 46 defining the open inner face of the section 28.

Within the housing 24 is positioned one end of a hollow shaft 46 forming part of arm 20, this shaft extending out of the housing through roller bearings 48 positioned within hollow boss 30 (as best shown in Fig. 3). A lubrication opening, covered by removable cap 49 (see Fig. 2), is provided in boss 30 for lubricating the bearings 48. A washer 50 surrounds shaft 46 within the housing and bears against the inner surface of boss 30, while outwardly of boss 30, the shaft is telescopically received within a hollow coupling 52 and fastened thereto by transverse pins 54. Here it is coupled to a shaft extension 56 which extends through a tubular sleeve 58 and is held thereon by similar pins 54.

Within the housing 24, a generally annular magnet assembly 60 is rotatably mounted on shaft 46 by means of needle bearings 62. The magnet assembly 60 comprises a central magnet portion 64, preferably constructed of the so-called "Alnico" magnetic material and designated as an "Alnico U magnet." This magnet portion 64 is provided with an annularly-spaced series of peripheral slots and is held between a pair of aluminum alloy, disc-like bearing plates 66 and 68. The entire magnet assembly 60 is held together in frictional, face-to-face contact by means of bolts 70 and nuts 72; the bolts extending through holes 74 and 76 respectively in the plates 66 and 68, and through the corresponding peripheral slots in the magnet portion 64.

Extending from the outer surface of plate 66 is a switch contact arm 78 having a threaded, transverse aperture through which extends a threaded contact pin 80 in the form of a screw having a slotted head at one end and a contact point at the other. The arm 78 itself is laterally positioned between a pair of spaced stops 82 extending outwardly from a micro-switch support bracket 84 fixed to the shaft 46 by a pin 86 in coaxial relation to the magnet assembly 60. The distance between the stops 82 is just sufficient to enable a rotatable movement of the arm 78, and consequently of the magnet, of about 6 degrees.

The bracket 84 is also provided with a depending arm 88 adjacent the free end of which are connected one end of each of a pair of coil springs 90. The opposite ends of these springs are connected to pins 92 on plate 66. These springs 90 are balancing springs which act to return the magnet to the neutral position (indicated in Fig. 5) after the deactivation of a magnetic field.

Connected to the bracket 84 is a micro-switch unit 94 having a switch arm 96. This switch arm 96 is adapted to be engaged by contact pin 80 upon rotation of the magnet assembly 60. The limit of arcuate movement of the arm 78 is, as stated above, limited to 6 degrees by the stops 82. However, within this limit, the contact pin 80 may be threadedly adjusted to vary the speed of switch actuation.

The magnetic field is concentrated between the poles of the magnet and the rotatable iron field ring 36. The copper conductor ring 38 acts as a conductor to cut the magnetic lines of force. The air gap between the magnet assembly and the field ring is kept to a minimum to concentrate the force lines at the poles of the magnet.

The magnet assembly 60 is rotated by the rotation of the tire 40 by the belt 12, the tire 40 acting to rotate the housing 24. As the housing 24 rotates, the rotating copper conductor ring cuts the magnetic field as the conductor rotates. This induces an E.M.F. and a resultant eddy current in the conductor. The magnetic field created by the eddy current reacts with the field produced by the magnet and creates a force which causes the magnet to be displaced in the direction of rotation through its 6° travel arc. When rotation of the tire 40 ceases, the housing ceases to rotate, thereby permitting the springs 90 to return the magnet to its neutral position. This disengages pin 80 from arm 96 thereby permitting the normally open micro-switch to open.

The micro-switch unit 94 is electrically connected in series with a load sensing switch assembly 98 and with the device to be controlled by means of wires 100 extending through the hollow shaft 46, shaft extension 56 and sleeve 58.

The shaft extension 56 and sleeve 58 extend into a hollow boss 102 on the housing 104 of assembly 98, and are clamped in this boss by means of a clamp stud 105 extending transversely through boss 102 and held in place by a nut 106. The boss 102 is integral with a hollow coupling unit 108 having an open side closed by a removable cover plate 110 which is held in place by screws 112. The coupling unit is also provided with a transverse hollow boss 114 through which extends a hollow shaft 116. This shaft is clamped in boss 114 by means of a clamp stud 118 and nut 120, and extends through a sealed ball bearing unit 122 into the housing 104. The opposite end of the shaft extends through a similar sealed ball bearing unit 122 positioned in a bracket 123 in the housing.

Within the housing, the shaft 116 is pinned to a collar 124 of a channeled spring-tension arm 126 by means of a pin 128. At its lower end, the arm 126 is intersected by a rod 130 having one end threadedly engaged in the wall of the housing 104, as at 132, and having its other end threadedly engaged by an adjusting nut 134. Positioned on the rod 130 between the nut 134 and the arm 126 is a coil spring 136 (best shown in Fig. 7). The tension of this spring 136 can be adjusted by adjustment of the nut 134 longitudinally of the rod 130. This spring 136 is provided for the purpose of biasing the shaft 116 into a normal position. In other words, this spring provides enough resilient pressure to bring the shaft 116 back into its normal position when the force causing it to rotate has been removed.

Also mounted on shaft 116 is a ratio adjusting arm 138 having a rib 140. The arm 138 is mounted on shaft 116 by means of a collar 142 through which extends a clamp stud 144 held in place by a nut 146. The collar 142, and therefore the arm 138, is adjustable longitudinally of the shaft 116; this adjustment being possible by removing the stud 144, sliding the collar 142 to the desired position on the shaft, and then replacing the stud.

The rib 140 at the lower end of arm 138 bears against a rib 148 of a transverse switch contact arm 150. This arm 150 is provided with a sleeve or socket 152 at one end and this socket encompasses a pivot bolt 154 which is threaded into the floor of the housing. At its opposite end, the arm 150 is provided with a bearing 156 through which extends a threaded contact pin 158. A nut 160 holds the pin 158 in threaded positions of longitudinal adjustment toward and away from a contact pin 162 extending out from a microswitch unit 164. This unit 164 is held in the housing by means of screws 166 extending through slots 168 in a switch cover member 170 and through the switch unit itself into the floor of the housing. These screws 166 also act as terminal posts for the wires.

A spring 172 is engaged at one end by a pin 174 on the arm 150 and at its other end by a pin 176 extending up from the floor of the housing. This spring acts to resiliently urge the rib 148 of arm 150 toward the rib 140 of arm 138 and the contact pin 158 against contact pin 162 (as best seen in Fig. 7).

The housing 104 is mounted on a base plate 178 by means of bolts 180 extending through mating apertures in flanges 182 of the housing and in the base plate 178. The base plate itself is provided with apertures 184 for bolting or otherwise securing it to a supporting means. The upper end of the housing is open and is closed by a removable cover plate 186 held in place over a gasket 187 by screws 188. An outlet 190 is provided in the rear wall of the housing to provide access for the wires connecting the rotary and load sensing switches in series to the device to be controlled.

In operation, while the belt 12 of the conveyor is moving and while there is a load on the belt, the tire 40 is rotated to rotate the switch unit 22 while the arm 20, including shaft 46, coupling 52, shaft extension 56 and sleeve 58, is pressed down by the weight of the conveyor belt on the unit 22. This pressure on arm 20 acts, through coupling 108, to rotate the shaft 116. This in turn, causes arm 138 to push switch arm 150 back, against the tension of spring 172, whereby the contact 158 is held away from contact 162 of the normally open micro-switch unit 164. In this manner, the rotation of rotary switch unit 22 maintains micro-switch 94 closed while the weight on the switch unit 22 maintains micro-switch 164 closed. The entire series circuit is thereby closed. If, however, the belt 12 should stop moving, the rotation of switch unit 22 would stop and this would result in opening the micro-switch 94, thereby opening the entire circuit. In like manner, if the belt continues to move, but the load thereon is removed, the absence of pressure on the switch unit 22 would cause arm 20 to move back into its normal position under the influence of spring 136 on shaft 116. This would cause arm 138 to move back from arm 150 permitting spring 172 to swing arm 150 forwardly to bring contact 158 against contact 162. By pushing against 162, contact 158 acts to open micro-switch 164 thereby opening the entire series circuit.

It is apparent from the above description that if either condition exists, to wit, lack of movement of the conveyor or lack of a load thereon, the circuit to the spraying device, or any other device being controlled, is opened and the device is made inoperative. When these conditions cease to exist, the circuit to the controlled device is automatically re-established.

The adjustability of the arm 138 longitudinally of the shaft 116 permits the adjustment of the contact area between the arm 138 and switch arm 150 relative to the pivot point of the switch arm. This permits a variation of the effective torque action of the switch arm and therefore a variation of the rapidity of activation or deactivation of the micro-switch 164.

It should further be noted that the threaded construction of contact pin 158, permitting it to be longitudinally adjusted toward and from the contact pin 162, permits a variation in switch sensitivity.

If it is desired to control the operation of the treating device only in conjunction with the load on the conveyor and regardless of its movement, the rotory switch assembly 22 is replaced by a wheel 200 illustrated in Fig. 8. This wheel is mounted for rotation on a shaft 202 which is substituted for shaft 20. The wheel 200 is held on the shaft 202 by bearings 204. The remaining structure comprising the load sensing means remains the same.

By this construction, the wheel 200 rotates with the conveyor belt 12 but does not actuate any switch means by its rotation or lack of rotation. However, while the load is on the conveyor, the arm 202 remains depressed to keep the micro-switch 164 closed, while, when the load is removed, the switch 164 is opened in the manner described above.

Obviously many modifications and variations of the present invention are possible in the light of the above teachings. It is, therefore, to be understood that within the scope of the appended claims, the invention may be practiced otherwise than as specifically described.

What is claimed as the invention is:

1. In combination, a conveyor including a longitudinally movable flexible strip and a sensing device under said strip, said sensing device comprising a wheel in frictional engagement with said strip and a rotary switch means adapted to be closed by rotation of said wheel when said strip is in motion, and a weight-actuated switch means operatively connected to said rotary switch means and operable by the weight load impressed on said wheel, said rotary and weight-actuated switch means being electrically connected in series with each other and with an electrically energized device controlled thereby.

2. The combination of claim 1 wherein said wheel comprises a disc rotatably positioned on one end of an arm the other end of which is operatively connected to said weight-actuated switch means.

3. An electrical network comprising a rotary switch means in series with a load-sensing switch means, said rotary switch means comprising a housing rotatably positioned on a shaft, an outer magnetic field ring and an inner conductor ring coaxial with each other and connected to said housing for rotation therewith, a generally annular magnet mounted for rotation on said shaft within said housing, said magnet being coaxial with said field ring and conductor ring, an electrical contact on said magnet, a micro-switch in said housing having an electrical contact adapted to be engaged by the contact on said magnet upon rotary movement of said magnet, and said shaft being in operative connection with an actuating means for said load-sensing switch means, said shaft being movable into operative position by a weight-load on said housing.

4. The network of claim 3 wherein said shaft is operatively connected to a second rotatable shaft in said load-sensing switch means in such manner that lateral movement of said first-mentioned shaft effects rotation of said second shaft on its axis, said second shaft supporting a switch control arm movable with said second shaft around its axis, said control arm being adapted to abut a contact supporting arm, said contact supporting arm having an electrical contact thereon adapted to engage with an electrical contact on a second micro-switch, and means resiliently urging said contact supporting arm in a direction to engage its contact with the contact on said second micro-switch.

5. The network of claim 4 wherein said second shaft is resiliently biased into a rotatable position wherein it retains said control arm in a position permitting the contact supporting arm to move its contact into engagement with the contact on said second micro-switch.

6. The network of claim 5 wherein said control arm is adjustable longitudinally of said second shaft.

7. In a control system, having weight-actuated and rotation-actuated switch means in an electrical circuit, said system comprising a control device including a housing, a rotatable shaft in said housing, means biasing said shaft into a neutral position of rotation on its axis, an actuating arm operatively connected to said shaft in a position to rotate said shaft away from said neutral position upon the application of a predetermined force to said actuating arm, an electrical switch means in said housing, an electrical contact on said switch means, a second electrical contact mounted on a movable contact arm in said housing and adapted to engage said first contact upon movement of said contact arm in one direction, means biasing said contact arm in said one direction, and a control arm on said shaft and movable with said shaft around its axis, said control arm being adapted to engage said contact arm and to move said contact arm in a second direction opposite said one direction upon rotation of said shaft by said actuating arm.

8. The system of claim 7 wherein said second electrical contact is adjustable toward and away from said first electrical contact.

9. The system of claim 7 wherein said means biasing said shaft into the neutral position comprises a biasing arm fixed to said shaft, a rod connected to said biasing arm and extending transversely to the longitudinal plane of said biasing arm, and a coil spring on said biasing arm positioned between said biasing arm and a nut threadedly engaged with the free, threaded end of said biasing arm.

10. The system of claim 7 wherein said actuating arm extends substantially perpendicularly to said shaft and supports a rotary switch means connected in electrical series with said switch means in said housing.

11. The system of claim 7 wherein said actuating arm extends substantially perpendicularly to said shaft and supports a wheel rotatable thereon.

References Cited in the file of this patent

UNITED STATES PATENTS

| | | |
|---|---|---|
| 2,262,375 | Smith | Nov. 11, 1941 |
| 2,367,775 | Hohman | Jan. 23, 1945 |